(12) United States Patent
Liao

(10) Patent No.: US 10,627,633 B2
(45) Date of Patent: Apr. 21, 2020

(54) WEARABLE SMART GLASSES

(71) Applicant: HiScene Information Technology Co., Ltd, Shanghai (CN)

(72) Inventor: Chunyuan Liao, Shanghai (CN)

(73) Assignee: HISCENE INFORMATION TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/415,837

(22) Filed: Jan. 25, 2017

(65) Prior Publication Data

US 2017/0371164 A1    Dec. 28, 2017

(30) Foreign Application Priority Data

Jun. 28, 2016 (CN) .................... 2016 2 0658820 U

(51) Int. Cl.
| | | |
|---|---|---|
| G02B 27/01 | (2006.01) | |
| G02C 5/14 | (2006.01) | |
| G02C 5/22 | (2006.01) | |
| G02C 7/10 | (2006.01) | |
| G02C 11/00 | (2006.01) | |
| G06F 3/01 | (2006.01) | |
| G06F 3/041 | (2006.01) | |
| G06T 19/00 | (2011.01) | |

(52) U.S. Cl.
CPC ....... G02B 27/0176 (2013.01); G02B 27/017 (2013.01); G02C 5/143 (2013.01); G02C 5/22 (2013.01); G02C 7/10 (2013.01); G02C 11/10 (2013.01); G06F 3/017 (2013.01); G06F 3/041 (2013.01); G06T 19/006 (2013.01); G02B 2027/0138 (2013.01); G02B 2027/0178 (2013.01); G02C 2200/16 (2013.01); G02C 2200/24 (2013.01)

(58) Field of Classification Search
CPC .............................................. G02B 2027/0178
See application file for complete search history.

(56) References Cited

U.S. PATENT DOCUMENTS

| | | | | |
|---|---|---|---|---|
| 5,440,356 A | * | 8/1995 | Fukuwa ................. | G02C 3/003 351/123 |
| 5,631,718 A | * | 5/1997 | Markovitz ............. | G02C 3/003 351/111 |
| 9,188,795 B1 | * | 11/2015 | Chin ........................ | G02C 5/16 |
| 2014/0002787 A1 | * | 1/2014 | Huang ..................... | G02C 5/16 351/113 |
| 2014/0118829 A1 | * | 5/2014 | Ma ....................... | G02B 5/1885 359/567 |

(Continued)

*Primary Examiner* — Gustavo Polo
(74) *Attorney, Agent, or Firm* — Jun He Law Offices P.C.; James J. Zhu

(57) ABSTRACT

Smart glasses comprise a glasses frame. The smart glasses further comprise a pair of glasses legs connected to two lateral portions of the glasses frame respectively, each of the glasses legs having a first end and a second end, wherein the second end of each of the glasses legs bends inwardly to form a first arc portion. In addition, the smart glasses further comprise a pair of clamping members each disposed at one of the glasses legs, wherein each of the clamping members comprises an elastic clamping element, said elastic clamping element being disposed at the inner side of said second end, wherein said elastic clamping element having a free end that bends inwardly to form a second arc portion.

17 Claims, 3 Drawing Sheets

(56) References Cited

U.S. PATENT DOCUMENTS

| | | | |
|---|---|---|---|
| 2014/0125789 A1* | 5/2014 | Bond | G02B 27/017 348/77 |
| 2014/0222526 A1* | 8/2014 | Shakil | G06Q 50/22 705/7.38 |
| 2014/0270316 A1* | 9/2014 | Fan | G02C 11/10 381/381 |
| 2015/0029868 A1* | 1/2015 | Mahasenan | H04L 41/12 370/242 |
| 2015/0035726 A1* | 2/2015 | Li | G02B 27/0172 345/8 |
| 2015/0070262 A1* | 3/2015 | Peters | G06F 3/013 345/156 |

* cited by examiner

WEARABLE SMART GLASSES

CROSS REFERENCE TO RELATED APPLICATIONS

This application claims priority to Chinese Patent Application No. 201620658820.4 filed on Jun. 28, 2016, the entire content of which is incorporated herein by reference.

TECHNICAL FIELD

The present application relates to smart glasses, and in particular, to wearable smart glasses.

BACKGROUND

Smart glasses are a kind of glasses having an independent operating system like a smart phone. Smart glasses can be installed, by a user, with programs e.g. software and games provided by software service providers. When the smart glasses are used by a user, functions such as adding schedules into calendars, map navigation, interacting with friends, taking photos and videos, or making video calls with friends can be realized using voice or action operations. In addition, wireless network access for smart glasses can be provided through mobile communication networks. At present, conventional wearable smart glasses mainly include the following categories.

1. Ordinary Glass Type

Smart glasses of ordinary glass type have a structure similar to a pair of ordinary glasses. Glasses Legs and lenses are integrated with each other. Or, if provided separately, there is certain angle of buckling between the glasses legs and the lenses, which are used for accommodating head circumference or for storage. In such a structure, however, if a mainboard is positioned at the side of the glass, in order to obtain wearing stability, it may have to be positioned very close to the head of the user. In operation, the mainboard generates a lot of heat which may be emitted to the user and adversely influence the user experience. Furthermore, the structure of such ordinary glass type is likely to have the problem of comfortable wearing, because a user's nose bridge may be pressed by the heavy glasses and the user may feel uncomfortable.

2. Head Hoop Type

The 360°-surrounding structure of this type wraps a head of the user for purpose of stable wearing. Disadvantages of this type may include the following. In order to have a balanced weight around the head, it's desired to increase the weight imposed upon the user's head, which may cause dizziness easily. Furthermore, it's inconvenient to wear this type of smart glasses.

3. Helmet Type

This structure is similar to a helmet, which is stable to wear. However, this kind of wearing manner is not widely applicable in most environments. It is particularly suitable for industrial application scenarios, and thus has a narrow range of application.

Thus, it is desired to develop a kind of smart wearable glasses which is convenient and comfortable to wear, thereby improving user experience and increasing applicable fields.

SUMMARY

An objective of the present application is to provide wearable smart glasses, which can solve the technical problems of conventional smart glasses, e.g. inconvenient and uncomfortable wearing experiences.

In order to achieve the aforesaid objective, the technical solutions of some aspects of the present application are provided as follows.

In one aspect, smart glasses comprises a glasses frame, a pair of glasses legs connected to two lateral portions of the glasses frame respectively, each of the glasses legs having a first end and a second end, wherein the second end of each of the glasses legs bends inwardly to form a first arc portion; and a pair of clamping members each disposed at one of the glasses legs respectively, wherein each of the clamping members comprises an elastic clamping element, each of said elastic clamping elements being disposed at the inner side of said second end of the glasses legs respectively, wherein each of said elastic clamping elements having a free end that bends inwardly to form a second arc portion.

In some embodiments, the glass frame has a front portion between the two lateral portions, and the laterals portions extend from the front portion.

In some embodiments, each of the first ends is connected to the respective lateral portion, and each of the second ends is in contact with a user's head at its inner side.

In some embodiments, said elastic clamping elements extend towards said first ends of the glasses legs, respectively.

In some embodiments, each of the glasses legs is connected to one of the lateral portions of the glasses frame by a hinge pin.

In some embodiments, the hinge pin is disposed at an end of the lateral portion and configured to pass through a hole at the first end of the glasses leg; and a tension spring is disposed between the hinge pin and the glasses leg, with one end of the tension spring being connected to the hinge pin and another end being connected to the glasses leg.

In some embodiments, the first and/or second arc portions are provided with soft supporting layers at their inner sides, respectively.

In some embodiments, the soft supporting layers are rubber and/or foam layers.

In some embodiments, the smart glasses further comprises: imaging lenses mounted to the front portion.

In some embodiments, the smart glasses further comprises light-shading lenses disposed on the glasses frame, wherein the light-shading lenses are provided in front of the imaging lenses.

In some embodiments, the light-shading lenses are of an integrated structure.

In some embodiments, the smart glasses further comprises a light emitting module disposed on at least one of the lateral portions, wherein the light emitting module emits light toward the imaging lenses to form images on the imaging lenses.

In some embodiments, the smart glasses further comprises a control circuit disposed on at least one of the lateral portions, wherein the control circuit is coupled to the light emitting module to control light emitting of the light emitting module.

In some embodiments, the smart glasses further comprises a depth camera module disposed at a center of the front portion, wherein the depth camera module is configured to collect user's gestures and provide an gesture signal to the control circuit.

In some embodiments, the smart glasses further comprises at least a touchpad disposed at an outer side of at least one of the lateral portions, said touchpad being configured to receive a touch input signal and provide said touch input signal to the control circuit.

In some embodiments, the elastic clamping elements are made of a stainless steel shrapnel, and the glasses legs are made of Al6030 aluminum alloy.

In some embodiments, the smart glasses further comprises two limiting portions disposed between the glasses frame and the respective glasses legs in order to limit rotation of the glasses leg with respect to the glasses frame after the glasses legs are unfolded.

In some embodiments, the smart glasses are augmented reality (AR) glasses.

The present application at least has the following advantages.

The wearable smart glasses of the present application have a first arc portion formed at each of the glasses legs and a second arc portion formed at each of the elastic clamping elements. When the smart glasses are worn on a user's head, clamping forces can be exerted onto the user's head by the elastic clamping elements together with the glasses legs, thereby the smart glasses of the present application fit better on the user's head compared with conventional glasses.

In addition, the smart glasses of the present application has a simple structure, a broad range of application, and is easy and comfortable to wear and carry.

In addition, the soft supporting layers can reduce the depression upon the user's head and therefore improve user experience.

In addition, by using rubber or foam materials, the friction between the glasses legs and the user's head can be increased, thereby making the wearing of smart glasses more stable.

In addition, each of the glasses legs and the glasses frame is connected by a hinge pin that passes through the hole of the glasses legs. The tension spring is disposed between the hinge pin and each of the glasses legs. When the glasses legs are fully unfolded and limited by limiting portions, the tension spring can prevent each of the glasses legs from rotating outward, thereby improving clamping intensity and stability. Moreover, the smart glasses are also suitable for a user with a large diameter of head.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

In FIGS. 1 and 2, reference signs have the following meanings.

1—glasses frame, 11—light-shading lenses, 12—depth camera module, 13—light emitting module, 2—glasses legs, 21—tension spring, 22—hinge pin, 3—elastic clamping element, 4—soft supporting layer.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

Figure 1:
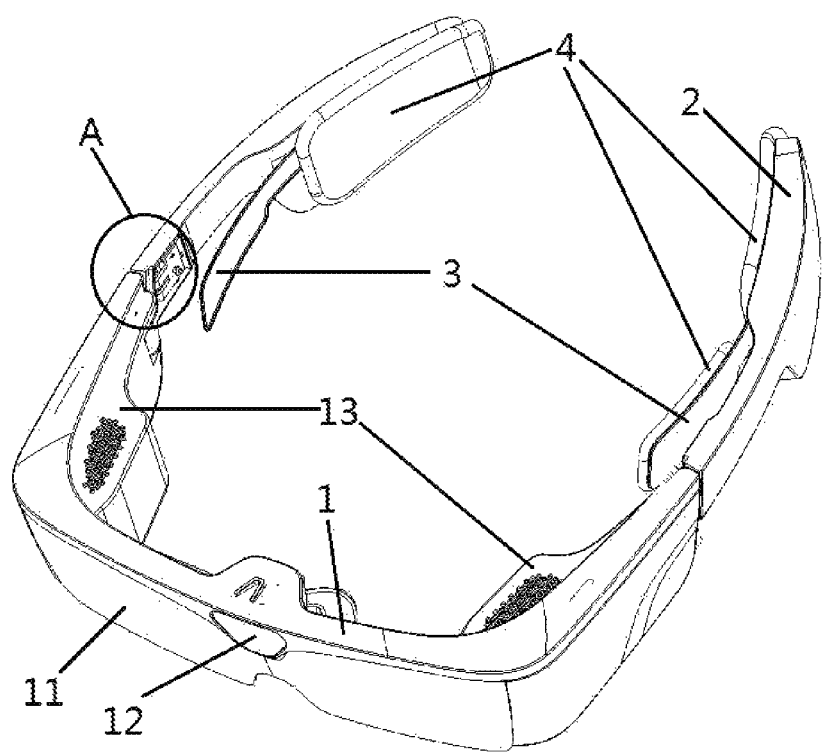
FIG. 1 is a structure diagram illustrating wearable smart glasses according to an embodiment of the present application.

As illustrated in FIG. 1, a wearable smart glasses is provided. The wearable smart glasses may include a glasses frame 1, a pair of glasses legs 2 and a pair of clamping members.

In one embodiment, the glasses frame 1 includes a front portion and two lateral portions laterally positioned at two sides of the front portion. The lateral portions extend a distance from the front portion and in a direction perpendicular to a longitudinal direction of the front portion.

According to an embodiment, each of the glasses legs 2 is mounted at one of the lateral portions respectively. Furthermore, each of the glasses legs 2 includes a first end being connected to one of said lateral portions, and a second end being contact with the head of a user at its inner side. In addition, the second end of each of the glasses legs 2 bends inwardly to form a first arc portion.

In another embodiment, each of the glasses legs 2 includes a clamping member. As shown in FIG. 1, the clamping member is an elastic clamping element 3 disposed at an inner side of the second end of each glasses legs. In addition, each elastic clamping element 3 extends towards the first end of the glasses leg and has a free end bending inwardly to form a second arc portion. With the first and second art portions in combination, a better fit between the smart glasses and the head of the user can be achieved.

According to an embodiment of the present application, the glasses legs 2 are made of aluminum alloy Al6063. Moreover, the elastic clamping element 3 can be made of stainless steel shrapnel.

Figure 2:
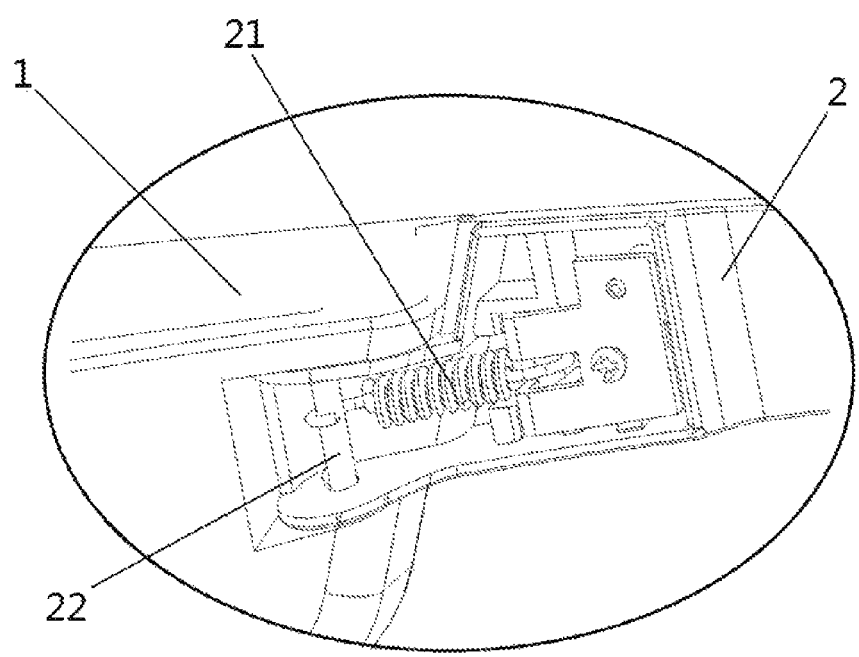
FIG. 2 is a partial enlarged diagram for portion A shown in FIG. 1.

With reference to FIG. 2, the first end of each glasses legs 2 is connected to the respective lateral portion of the glasses frame 1 by a hinge pin 22, which allows the glasses legs 2 to rotatably unfold or fold around the hinge pin 22 with respect to the glasses frame 1.

In an embodiment, a limiting portion is disposed between each glasses leg 2 and the glasses frame 1 for limiting rotation of the respective glasses leg 2, after the glasses leg 2 is fully unfolded with respect to the glasses frame 1, so that the glasses leg 2 can be held on the user's head.

According to one embodiment of the present application, each hinge pin 22 is mounted at an end of the respective lateral portion of the glasses frame 1, and goes through a waist-shaped hole on the respective glasses leg 2. The waist-shaped hole extends outward from the respective glasses leg 2.

In one embodiment, a tension spring 21 is disposed between the hinge pin 22 and the corresponding glasses leg 2. One end of the tension spring 21 is connected to the hinge pin 22, and the other end of the tension spring 21 is connected to an inner side of the corresponding glasses leg 2. With such a structure, after the glasses legs 2 are fit with the glasses frame 1 using the limiting portions, if the glasses legs 2 continue to rotate outward by external forces applied thereto, the tension spring 21 will be stretched and resist such rotation, thereby increasing clamping intensity and improving clamping stability. Moreover, this configuration is also suitable for a user with a large head diameter.

According to one embodiment, soft supporting layers 4 can be disposed at respective inner sides of the first and/or second arc portions. Specifically, according to one embodiment of the present application, the soft supporting layers 4 are rubber and/or foam layers. With the soft supporting layers 4, user comfortability can be improved. For example, a pressure onto the user's head may be reduced, and friction between the glasses legs and the user's head may be increased. Thus, it will be more stable and comfortable to wear such smart glasses.

In one embodiment, the smart glasses further includes light-shading lenses 11 mounted to the glasses frame 1. According to another embodiment, the light-shading lenses 11 may have an integrated structure.

According to one embodiment, the smart glasses further includes imaging lenses (not shown) positioned behind the light-shading lenses 11. The imaging lenses can be, for example, semi-transparent and semi-reflective lenses/films, or holographic diffraction waveguide gratings, or other suitable imaging components. For a user who wears the smart glasses, the imaging lenses function as a display screen. From said imaging lenses, display content of the smart wearable glasses, for example, a graphic user interface, can be observed.

Furthermore, in one embodiment, the smart glasses may include a light emitting module 13 disposed at each lateral portion of the glasses frame. The light emitting module 13 functions to emit light toward the imaging lenses, thereby forming images on the imaging lenses. It would be appreciated that the present application does not limit the imaging principle of the wearable smart glasses.

In some embodiments, a control circuit can be disposed at one of the lateral portions of the glasses frame. The control circuit is coupled to the light emitting module 13 to control light emitting of the light emitting module, i.e. the output of the light emitting module.

According to one embodiment, the smart glasses may further include at least a touchpad disposed at a lateral portion of the glasses frame 1. The touchpad is configured to generate a touch input signal, and is coupled to the control circuit to provide the control circuit with the touch input signal.

In one embodiment, a depth camera module 12 is disposed at center of the front portion of the glasses frame 1. The depth camera module 12 is configured to collect user's gestures and generate an operation gesture signal accordingly. Furthermore, the depth camera module 12 is coupled to the control circuit to provide the user's gesture signal being collected.

Furthermore, in order to facilitate the understanding of the present application, the principle of the depth camera module 12 is briefly introduced herein. In the field of image processing/computer vision, depth data can be obtained in various manners. For example, depth data can be obtained using a parallax of two cameras, or by capturing a same scenario using a single camera at two different angles, or by calculating the depth data by focusing at different distances.

For example, a dual-camera cab (two cameras) can simulate the operation of human eyes (two eyes can easily locate the distance of an object, but the locating function would be significantly degraded if one eye is closed). Briefly speaking, by calculating two angles between the object and the left or right camera of the dual-camera cab, as well as obtaining a value y (i.e. the distance between the two cameras, which is typically a constant value), a value z (i.e. distance from the object to the user) can be easily calculated.

Another technique of obtaining depth data is Time of Flight (TOF) approach. The TOF approach is a 3d-imaging technique that continuously transmits light pulses to an object, and then receives lights returned from the object using sensors. The distance to the object can be obtained by calculating the time of flight of the light pulses. Depth accuracy of TOF does not vary as the distance varies, and largely performs well at a centimeter level.

Some commercially available depth camera modules can obtain depth values for each pixel of the depth camera modules, such as Kinect. The operating principle of an exemplary module is described as follows, which can be used in the smart glasses of the present application.

Figure 3:
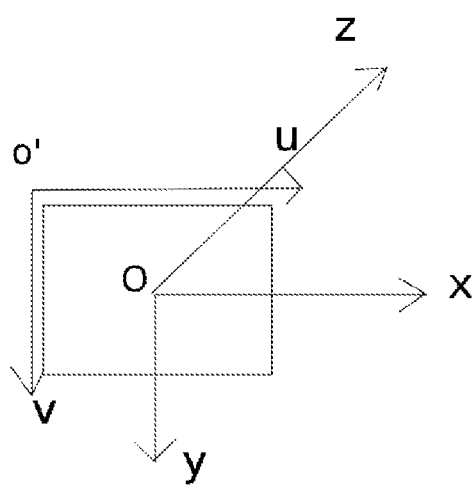
FIG. 3 illustrates a coordinate system of an OpenCV system according to an embodiment of the present disclosure.

Firstly, as shown in FIG. 3, a coordinate system of an OpenCV system is used. The coordinate system o'-uv is an image coordinate system, and the coordinate system o-xyz is a Kinect coordinate system. Assuming that a point in the picture is (u,v) and its corresponding three-dimensional location is (x,y,z), then a conversion relation between them can be obtained by the following equation.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x \\ y \\ z \end{bmatrix}$$

The equation above can be simplified as follows.

$$\begin{cases} x = \frac{(u - c_x)z}{f_x} \\ y = \frac{(v - c_y)z}{f_y} \\ z = dep(u, v)/s \end{cases}$$

The later equations show a method for calculating the position of a three-dimensional point. In particular, depth data (16 bits of unsigned integer is defined in the Kinect system) can be read from depth images, which can be divided by a zoom factor s in direction z, such that an integer of the depth image is transferred to data having a unit of meter. Then, x, y can be calculated using the above equations. In the above equations, symbols $f_x$ and $f_x$ represents a focal distance along axis x or y, respectively, and symbol $c_x$ and $c_y$ represents the position of the center point.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

The invention claimed is:

1. A wearable smart glasses, comprising:
a glasses frame having a front portion and two lateral portions extending a distance from the front portion and in a direction perpendicular to a longitudinal direction of the front portion, wherein the front portion comprises imaging lenses, and at least one of the lateral portions comprises a light emitting module disposed thereat to emit light toward the imaging lenses;
a pair of glasses legs connected to the two lateral portions of the glasses frame respectively, each of the glasses legs having a first end and a second end, wherein the first end of each of the glasses is connected to the corresponding lateral portion of the glasses frame by a hinge pin and a tension spring that applies tension to the glasses leg when the glasses leg rotates outward after the glasses leg is fit with the glasses frame, and wherein the second end of each of the glasses legs bends inwardly to form a first arc portion having a soft supporting layer at its inner side; and
a pair of elastic clamping elements each attached to the inner side of the first arc portion of one of the glasses legs, wherein each of said elastic clamping elements extends from the inner side of the first arc portion of one of the glasses legs towards said first end of the one of the glasses legs, and has a free end that bends inwardly to form a second arc portion;
wherein when said smart glasses are worn on the user's head, the soft supporting layer of said first arc portion and said second arc portion are both in direct contact with a user's head, and said second arc portion can deform and exert a clamping force to the user head due to elasticity, thereby improving fit between the smart glasses and the user's head;
wherein the first arc portion of one of the glass legs is not rotatable relative to the corresponding glass leg.

2. The smart glasses of claim 1, each of the second ends is in contact with a user's head at its inner side.

3. The smart glasses of claim 1, wherein the hinge pin is disposed at an end of the lateral portion and configured to pass through a hole at the first end of the glasses leg; and
the tension spring is disposed between the hinge pin and the glasses leg, with one end of the tension spring being connected to the hinge pin and another end being connected to the glasses leg.

4. The smart glasses of claim 1, wherein the second arc portion is also provided with the soft supporting layer at its inner side.

5. The smart glasses of claim 4, wherein the soft supporting layers are rubber and/or foam layers.

6. The smart glasses of claim 1, further comprising:
light-shading lenses disposed on the glasses frame, wherein the light-shading lenses are provided in front of the imaging lenses.

7. The smart glasses of claim 6, wherein the light-shading lenses are of an integrated structure.

8. The smart glasses of claim 1, further comprising:
a control circuit disposed on at least one of the lateral portions, wherein the control circuit is coupled to the light emitting module to control light emitting of the light emitting module.

9. The smart glasses of claim 8, further comprising:
a depth camera module disposed at a center of the front portion, wherein the depth camera module is configured to collect user's gestures and provide an gesture signal to the control circuit.

10. The smart glasses of claim 8, further comprising:
at least a touchpad disposed at an outer side of at least one of the lateral portions, said touchpad being configured to receive a touch input signal and provide said touch input signal to the control circuit.

11. The smart glasses of claim 1, wherein the elastic clamping elements are made of a stainless steel shrapnel, and the glasses legs are made of Al6030 aluminum alloy.

12. The smart glasses of claim 1, further comprising:
two limiting portions disposed between the glasses frame and the respective glasses legs in order to limit rotation of the glasses leg with respect to the glasses frame after the glasses legs are unfolded.

13. The smart glasses of claim 1, wherein the smart glasses are augmented reality (AR) glasses.

14. The smart glasses of claim 1, wherein each of said elastic clamping elements is ended at said free end away from the first arc portion.

15. The smart glasses of claim 1, wherein said first arc portion and said second arc portion form a third arc portion.

16. The smart glasses of claim 15, wherein a radius of curvature of the third arc portion is variable, so as to provide a better fit on different user's head.

17. The smart glasses of claim 1, wherein the glasses legs are made of a first material having a first elasticity, and the elastic clamping elements are made of a second material more resilient than the first material.

* * * * *